(12) United States Patent
McCanless (10) Patent No.: US 11,353,171 B2
(45) Date of Patent: Jun. 7, 2022

(54) HORTICULTURAL LIGHT FIXTURE

(71) Applicant: ABL IP Holding LLC, Atlanta, GA (US)

(72) Inventor: Forrest Starnes McCanless, Oxford, GA (US)

(73) Assignee: ABL IP Holding LLC, Atlanta, GA (US)

( * ) Notice: Subject to any disclaimer, the term of this patent is extended or adjusted under 35 U.S.C. 154(b) by 62 days.

(21) Appl. No.: 16/804,109

(22) Filed: Feb. 28, 2020

(65) Prior Publication Data

US 2020/0278090 A1 Sep. 3, 2020

Related U.S. Application Data

(60) Provisional application No. 62/812,720, filed on Mar. 1, 2019.

(51) Int. Cl.
| | |
|---|---|
| *F21S 2/00* | (2016.01) |
| *F21V 23/00* | (2015.01) |
| *F21V 9/08* | (2018.01) |
| *F21V 29/83* | (2015.01) |
| *A01G 7/04* | (2006.01) |
| *F21Y 115/10* | (2016.01) |

(52) U.S. Cl.
CPC ............... *F21S 2/005* (2013.01); *F21V 9/08* (2013.01); *F21V 23/007* (2013.01); *F21V 29/83* (2015.01); *A01G 7/045* (2013.01); *F21Y 2115/10* (2016.08)

(58) Field of Classification Search
CPC ... A01G 7/045; F21K 9/00; F21K 9/237–238; F21S 2/005; F21S 8/06–066; F21V 9/08; F21V 23/007–008; F21V 29/83; F21Y 2115/10
USPC .................................................. 362/221, 805
See application file for complete search history.

(56) References Cited

U.S. PATENT DOCUMENTS

| | | | |
|---|---|---|---|
| 6,623,132 B2* | 9/2003 | Lekson | F21S 43/249 362/600 |
| 9,016,892 B1* | 4/2015 | Scribante | F21V 17/002 362/326 |
| D809,701 S | 2/2018 | Tweel et al. | |
| D822,886 S | 7/2018 | Tweel et al. | |
| D824,581 S | 7/2018 | Tweel et al. | |
| 10,172,296 B2 | 1/2019 | Krijn et al. | |
| 10,206,251 B2* | 2/2019 | Ernst | F21V 9/08 |
| D855,248 S | 7/2019 | Tweel et al. | |
| 2017/0356606 A1* | 12/2017 | Rashidi Doust | F21V 23/002 |
| 2018/0031216 A1* | 2/2018 | Tweel | F21S 8/026 |

* cited by examiner

*Primary Examiner* — Jason M Han
(74) *Attorney, Agent, or Firm* — Kilpatrick Townsend & Stockton LLP (57) ABSTRACT

A light fixture includes an electronics housing, opposing connector assemblies and at least one light module. The electronics housing and the at least one light module are each supported by and extend between the opposing connector assemblies such that a gap is provided between the electronics housing and light module.

14 Claims, 10 Drawing Sheets

HORTICULTURAL LIGHT FIXTURE

REFERENCE TO RELATED APPLICATION

This application claims the benefit of U.S. Provisional Patent Application No. 62/812,720, filed on Mar. 1, 2019, and entitled HORTICULTURAL LIGHT FIXTURE, the content of which is hereby incorporated by reference in its entirety.

FIELD OF THE INVENTION

Embodiments of the present invention relate to a light fixture that can be, but that does not have to be, used in horticultural environments. The light fixture has improved versatility in that the fixture can be scaled up or down with relative ease to tailor the fixture for particular applications.

BACKGROUND

Different light fixtures, such as fixtures having different lumen outputs, are needed for different applications. Challenges arise in designing solutions that easily accommodate this range of options. Oftentimes, different and unique fixtures or fixture parts must be designed and offered, each targeted for a particular application. It would be useful to have a single fixture that could be built upon itself to scale up or down the lumen output.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

According to certain embodiments, a light fixture includes an electronics housing, a first connector assembly, a second connector assembly, and a plurality of light modules. The electronics housing includes a first end and a second end opposite from the first end, and the electronics housing extends between the first connector assembly and the second connector assembly. Each light module is supported by the first connector assembly and the second connector assembly and extends between the first connector assembly and the second connector assembly. In various aspects, the electronics housing is not directly connected to the plurality of light modules. In some examples, the electronics housing is provided in a plane offset from the plurality of light modules. In certain aspects, the light fixture is a horticultural light fixture.

According to various embodiments, a light fixture includes an electronics housing, a connector assembly, and at least one light module. The electronics housing includes a first end and a second end opposite from the first end. The connector assembly includes a housing support location and a plurality of module support locations, each module support location configured to position a light module relative to the connector assembly. In some cases, the housing support location is vertically offset from the plurality of module support locations. The first end of the electronics housing may be attached to the connector assembly at the housing support location, and the at least one light module may be attached to the connector assembly at one of the plurality of module support locations.

According to some embodiments, a light fixture includes an electronics housing, a first connector assembly, a second connector assembly, a first light module, and a second light module. The electronics housing includes a base wall, a top wall opposite from the base wall, and at least one side wall extending from the base wall to the top wall, and together, the base wall, the top wall, and the at least one side wall define a housing chamber. In some cases, the base wall and the top wall each include a plurality of ventilation apertures that are in fluid communication with the housing chamber. The electronics housing, the first light module, and the second light module each extend between the first connector assembly and the second connector assembly. In some examples, the first light module and the second light module extend at least partially below the base wall of the electronics housing, and the first light module is horizontally spaced apart from the second light module such that a gap is between the first light module and the second light module.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others are intended to refer to the orientation as illustrated and described in the figure (or figures) to which the components and directions are referencing.

Certain embodiments of the present invention provide a light fixture that can be built upon itself to scale up or down the lumen output. More specifically, embodiments of the light fixture include an electronic housing positioned above one or more light modules. Each light module can be identical to the others, facilitating manufacturing and assembly, although it need not be in other examples. Connector assemblies may connect the electronic housing and the light modules. Moreover, the fixture can be tailored to the light needs of particular applications by adding or removing light modules from the fixture.

FIGS. 1-13 illustrate an example of a light fixture 100 according to aspects of the present disclosure. In some examples, the light fixture 100 may be configured to be suspended from a ceiling (such as with brackets, a pendant hanger, or other suitable mechanism), but it is also contemplated that the light fixture 100 can be recessed within a ceiling, surface-mounted on the ceiling, or supported at various other locations and/or on various other structures or components as desired. The light fixture 100 may be provided as an indoor or an outdoor fixture. In some examples, and as discussed below, the light fixture 100 may be used in horticultural environments for plant cultivation.

Figure 1:
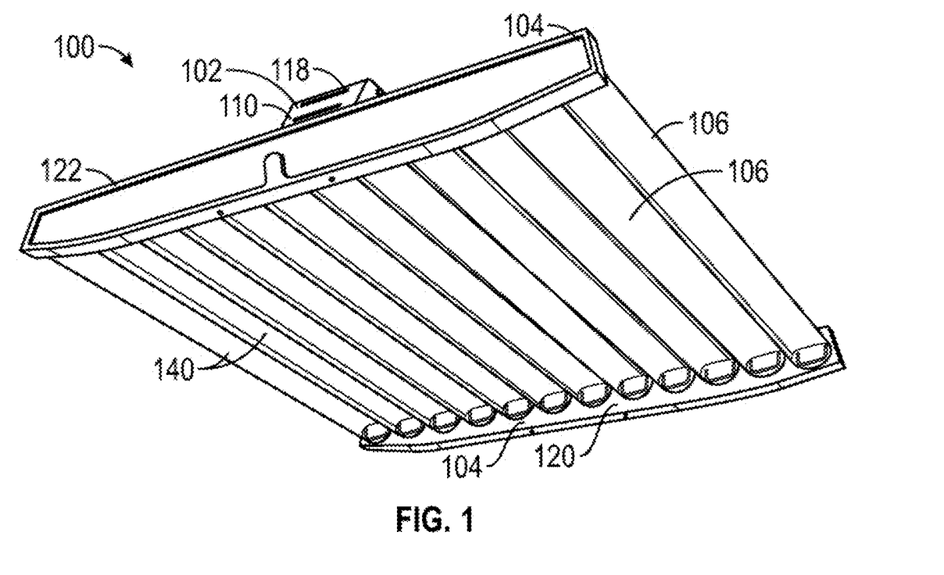
FIG. 1 is a bottom perspective view of a light fixture according to embodiments of the disclosure.
Figure 2:
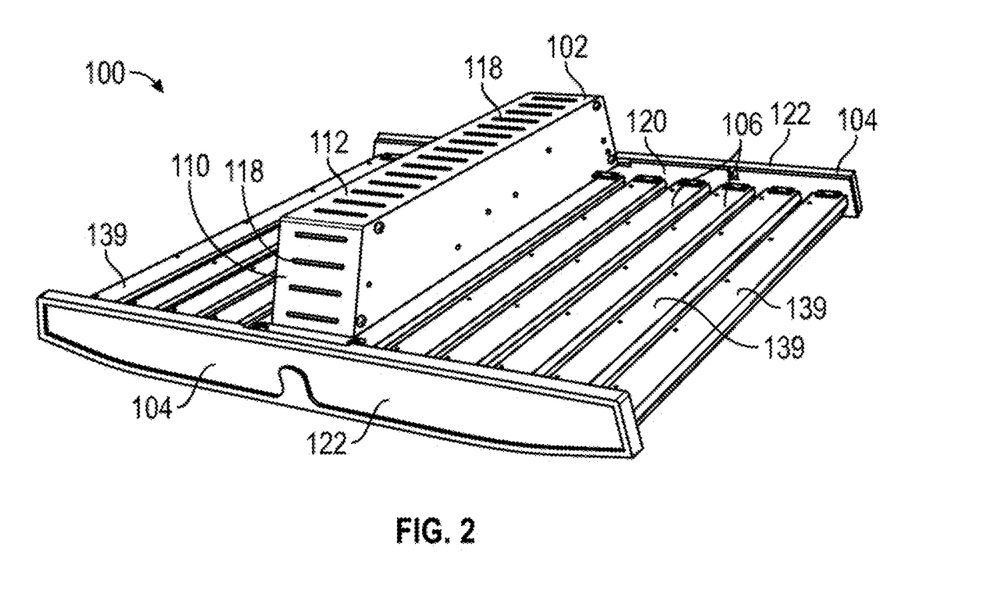
FIG. 2 is a top perspective view of the light fixture of FIG. 1.
Figure 3:
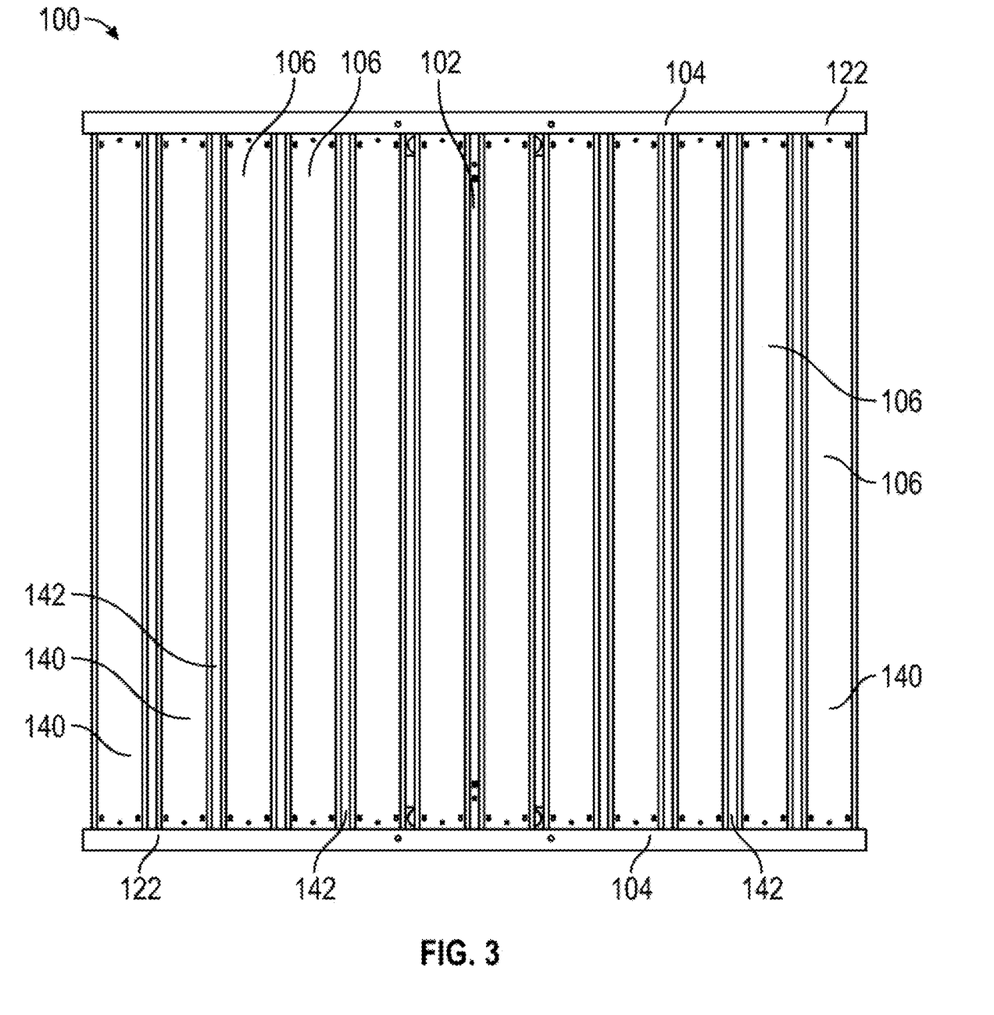
FIG. 3 is a bottom view of the light fixture of FIG. 1.
Figure 4:
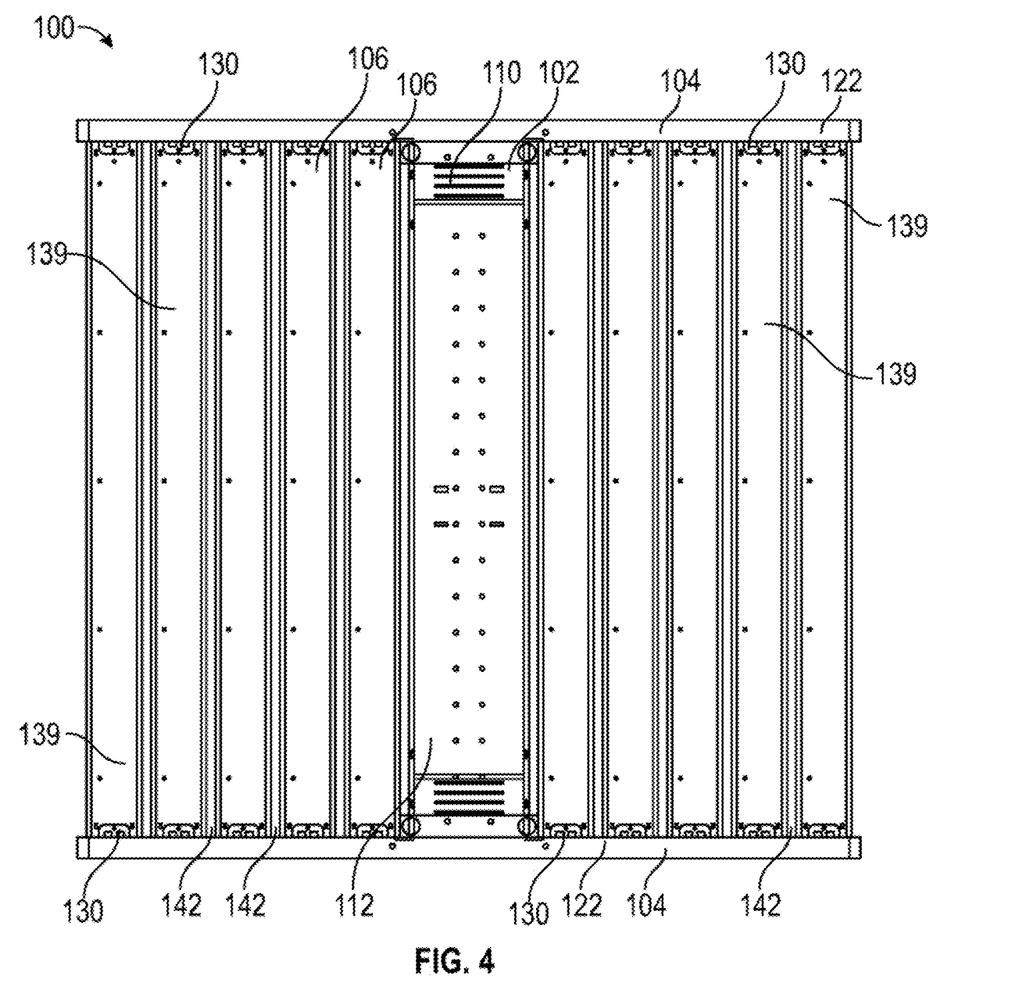
FIG. 4 is a top view of the light fixture of FIG. 1.
Figure 5:
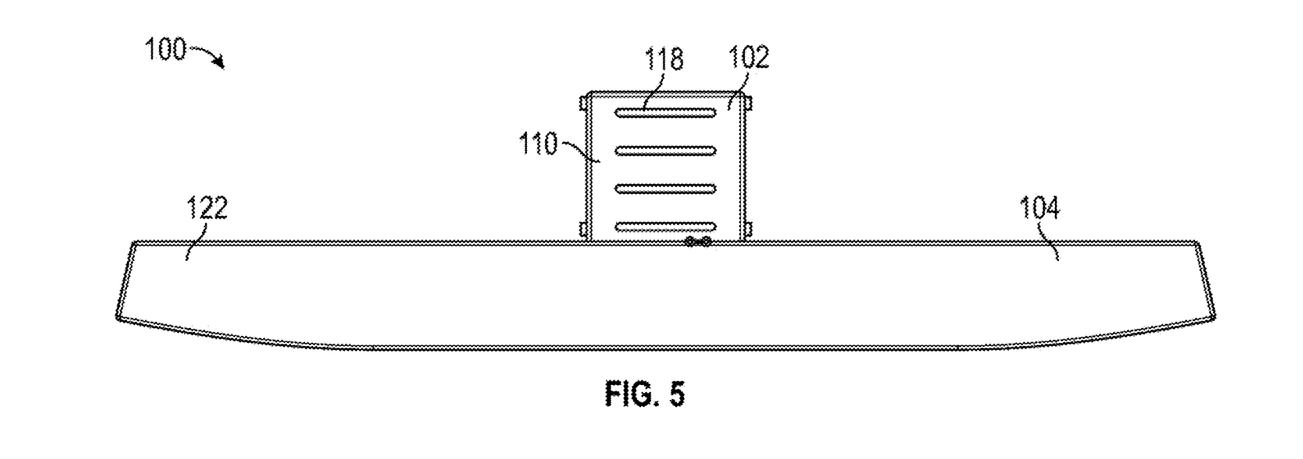
FIG. 5 is an end view of the light fixture of FIG. 1.
Figure 6:
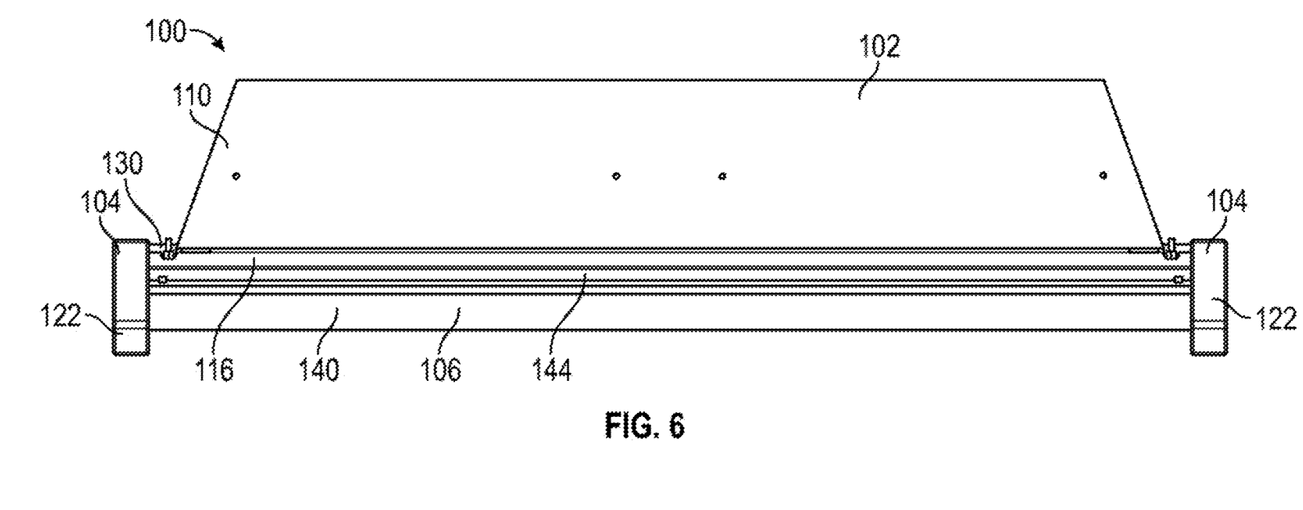
FIG. 6 is a side view of the light fixture of FIG. 1.
Figure 7:
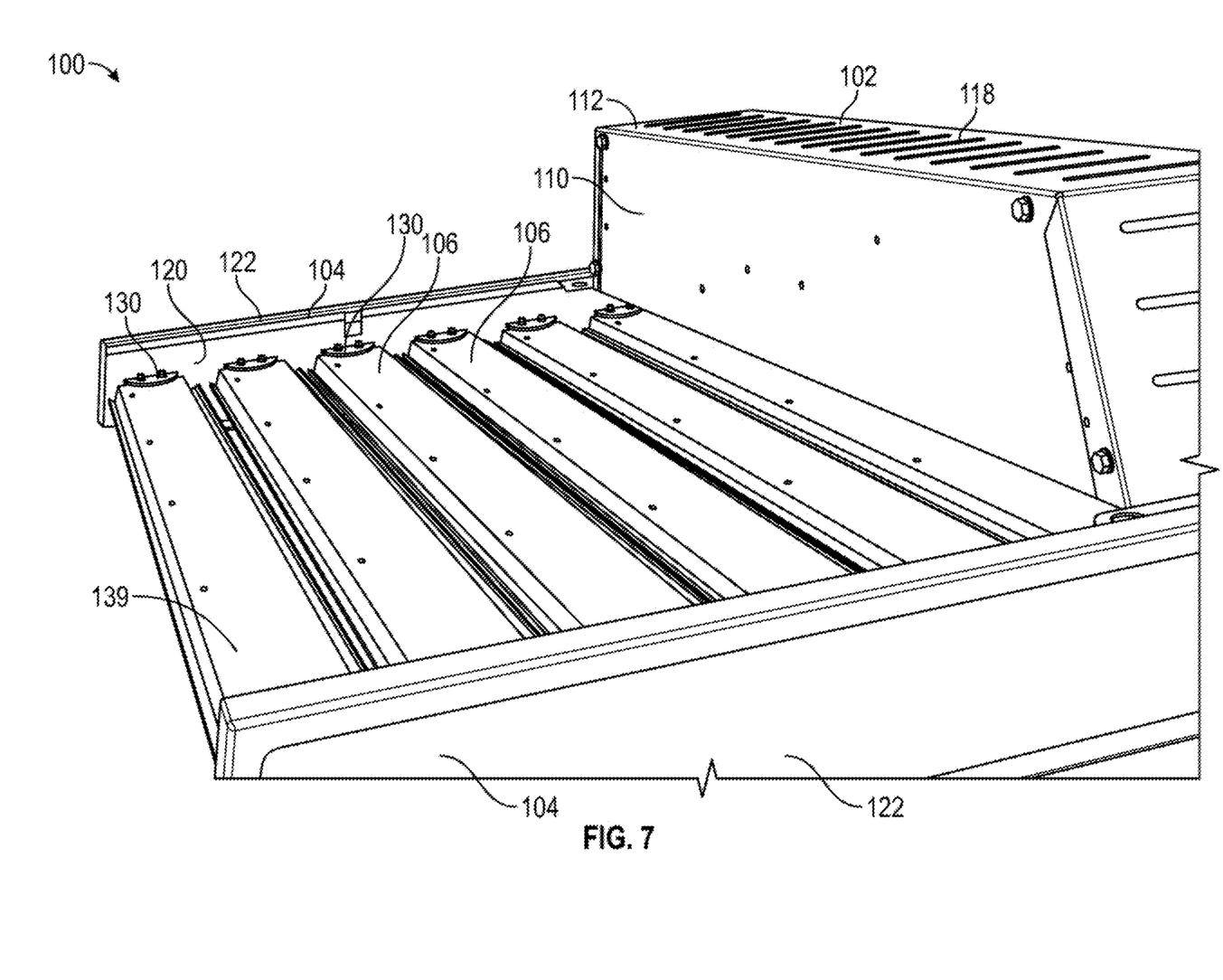
FIG. 7 is a top perspective view of a portion of the light fixture of FIG. 1.

The light fixture 100 includes an electronics housing 102, a pair of connector assemblies 104 on opposing ends of the light fixture 100, and at least one light module or light bar 106. As illustrated in FIG. 1, for example, in various examples, the light fixture 100 includes a plurality of light modules 106, and as such, the number of light modules 106 should not be considered limiting on the current disclosure.

The electronics housing 102 may house various electrical components that drive the light fixture 100, including, but not limited to, a driver, battery pack(s), wireless communication modules, and/or other suitable components as desired. As best illustrated in FIGS. 10-13, the electronics housing 102 includes a base wall 108, a top wall 112 opposite from the base wall 108, and one or more side walls 110 extending between the base wall 108 and the top wall 112. Any or all of the base wall 108, the side walls 110, and the top wall 112 may be formed integrally, or alternatively they may be formed separately and subsequently attached to each other using any suitable mechanical (e.g., screws, pins, hooks, bolts, and/or other suitable fasteners) or chemical (e.g., adhesive) retention means. As best illustrated in FIGS. 10-13, the walls 108, 110, 112 define a housing chamber 114, and the various electrical components of the light fixture 100 may be at least partially housed within the housing chamber 114. In some examples, the base wall 108 may extend beyond the side walls 110 at opposing ends of the electronics housing 102 such that less than the entire base wall 108 forms the housing chamber 114 (see, e.g., FIGS. 4, 10, and 11), although it need not in other examples.

The electronics housing 102 includes a pathway for ingress/egress of wiring and/or other electrical connections out of/into the housing chamber 114 for connection with other components of the light fixture 100 (e.g., the light modules 106). Such a pathway may be created by providing one or more apertures in one or more of the base wall 108, top wall 112, and/or side walls 110. In one embodiment and as illustrated in FIGS. 10-13, a channel 116 formed in or provided on the base wall 108. The channel 116 may be shaped directly in the base wall 108 or may be formed separately and subsequently attached to the underside of the base wall 108. Regardless, the channel 116 forms a pathway for directing wires into and out of the electronics housing 102. The channel 116 includes opposing channel openings 119 that may align with openings 132 of connector assemblies 104 when the light fixture is assembled 100, as described in more detail below.

In some examples, ventilation slots or apertures 118 are provided in any or all of the base wall 108, the side walls 110, and the top wall 112 that are in fluid communication with the housing chamber 114. In the example of FIGS. 1-13, ventilation slots 118 are provided in the base wall 108, some of the side walls 110 (e.g., the side walls 110 proximate to the connector assemblies 104), and the top wall 112; however, the ventilation slots 118 may be provided in various other configurations as desired. The ventilation slots 118 may provide thermal management for the electronics housing 102 by allowing for air to flow into and through the electronics housing 102. In some cases, the ventilation slots 118 promote at least vertical ventilation, although it need not in other examples. In various other examples, the ventilation slots 118 may be omitted.

The electronic housing 102 may have any shape, including a rectilinear or curved shape. One or more drivers may be provided in the housing chamber 114, such as by mounting to the base wall 108, the side walls 110, and/or the top wall 112. One or more of the walls may be used for mounting accessories to the light fixture 100, such as, but not limited to, motion sensors, wireless communication modules, etc. In various cases, one or more of the walls 108, 110, 112 may be hingedly attached so as to permit access to the housing chamber 114 should servicing or replacement of the wires or other electronics be required.

Figure 8:
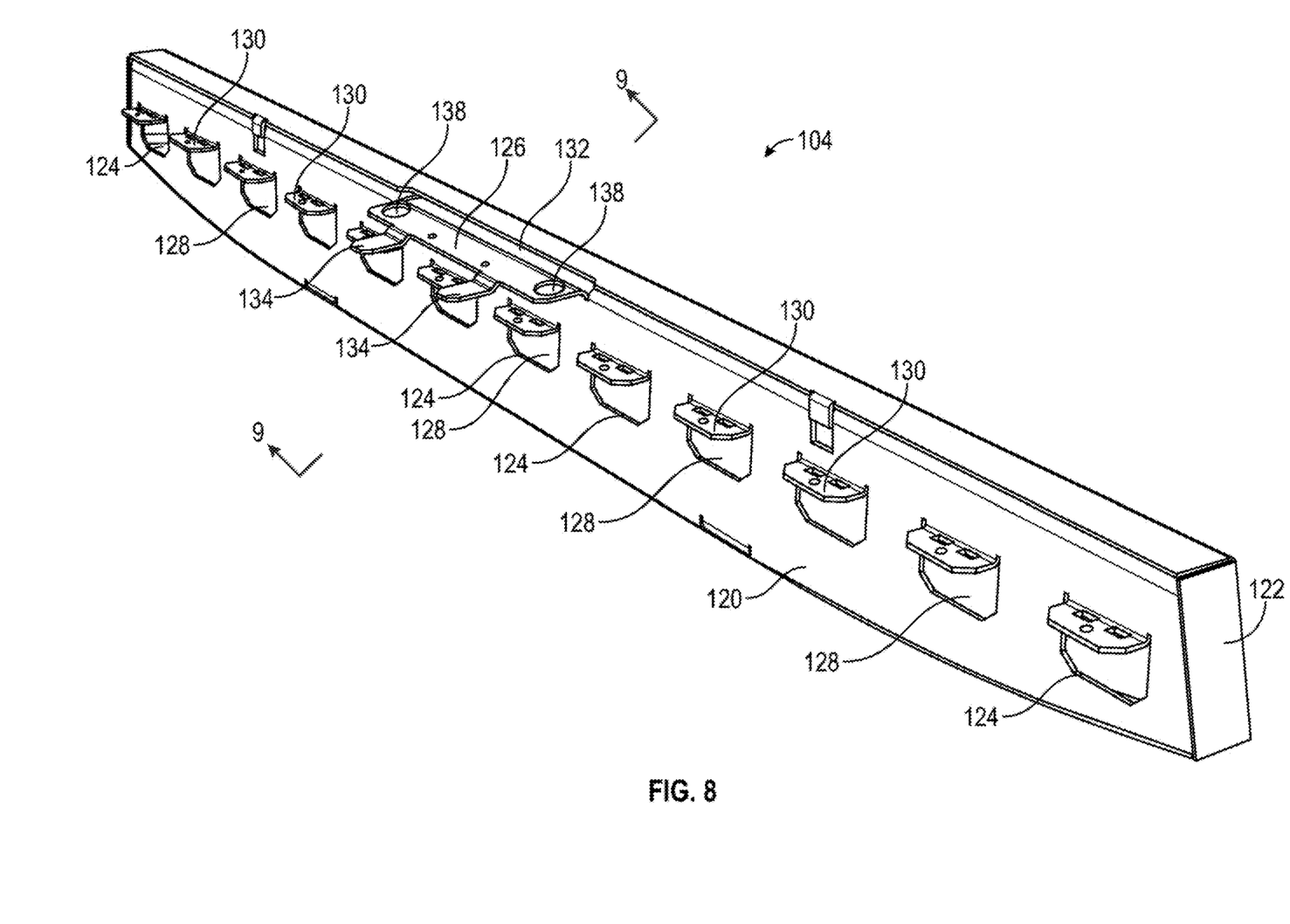
FIG. 8 is a perspective view of a connector assembly of the light fixture of FIG. 1 according to embodiments of the disclosure.
Figure 9:
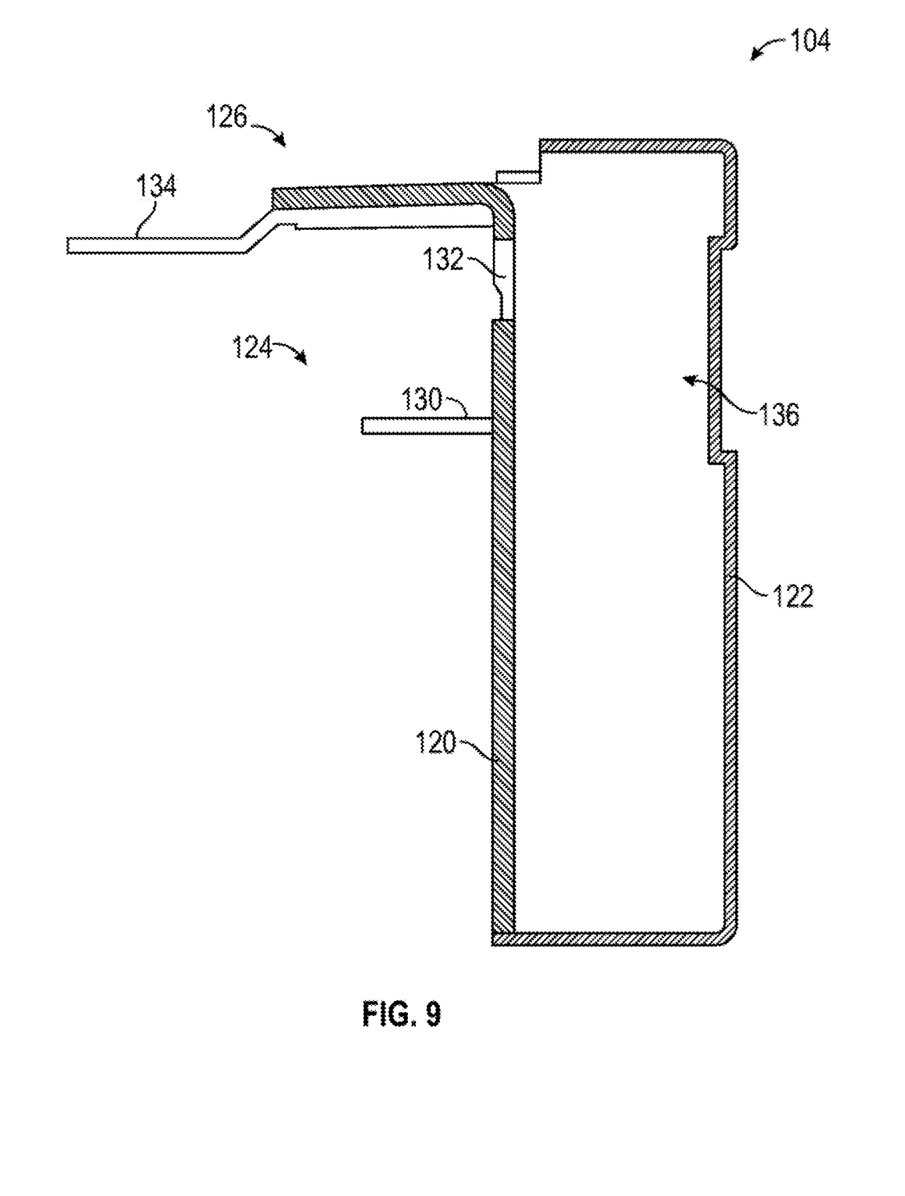
FIG. 9 is a sectional view of the connector assembly of FIG. 8 taken along line 9-9 in FIG. 8.
Figure 10:
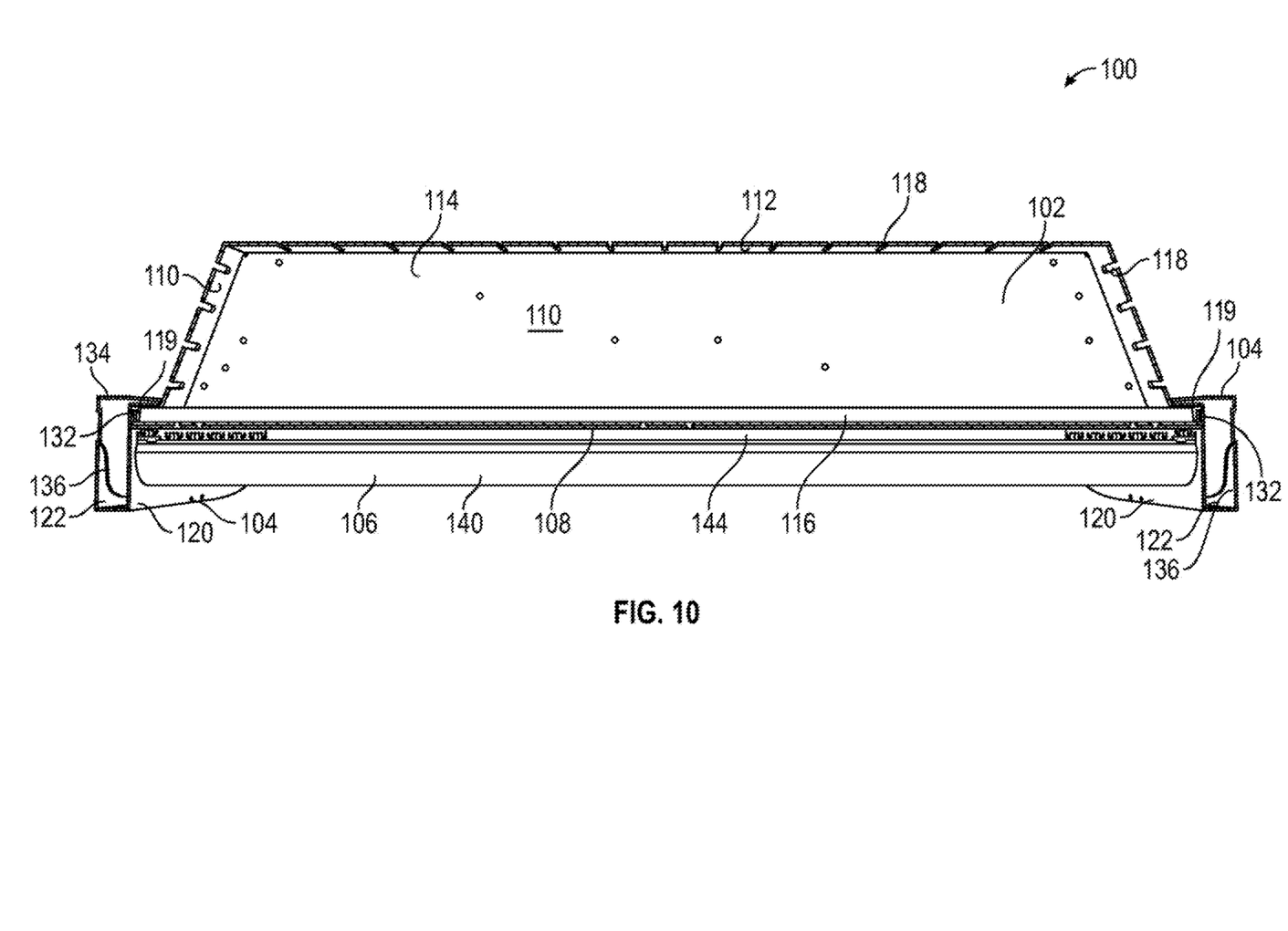
FIG. 10 is a cut away view of the light fixture of FIG. 1.
Figure 11:
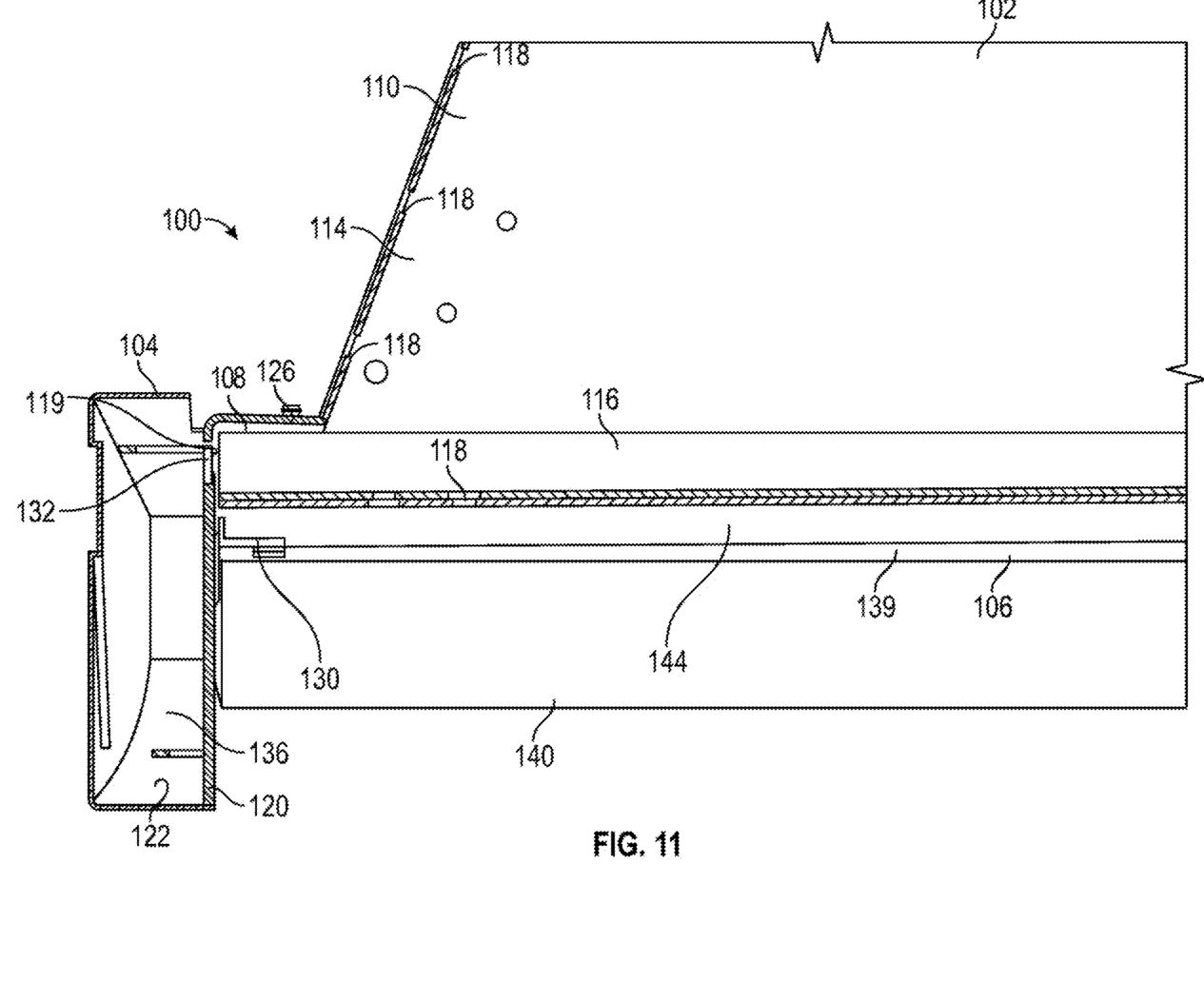
FIG. 11 is an enlarged cut away view of a portion the light fixture of FIG. 1.

As best illustrated in FIGS. 8 and 9, for example, each connector assembly 104 includes an inner plate 120 and an end cap 122. In some examples, the inner plate 120 and end cap 122 may be formed separately and subsequently attached to each other using any suitable mechanical (e.g., screws or other fasteners) or chemical (e.g., adhesive) retention means, or alternatively they may be formed integrally. Each connector assembly 104 includes one or more module support locations 124 and at least one housing support location 126. In some examples, the module support location(s) 124 and the housing support location(s) 126 may be provided on the inner plate 120. In certain examples, the inner plate 120 may be removable from the end cap 122 such that a particular type, number, pattern, etc. of the module support location(s) 124 and the housing support location(s) 126 can be adjusted as desired (e.g., based on a desired lumen output). In other examples, the module support location(s) 124 and the housing support location(s) 126 may be provided at other locations and/or the inner plate 120 is not removable from the end cap 122.

Each module support location 124 includes an opening 128 and a module mounting feature 130. Similarly, the housing support location 126 includes an opening 132 and a housing mounting feature 134. As best illustrated in FIGS. 8 and 9, in various examples the housing support location 126 is vertically offset from the module support locations 124. The mounting features 130, 134 allow for positioning of the light modules 106 and electronics housing 102, respectively, relative to the connector assembly 104. In some cases, the mounting features 130, 134 may at least partially support the housing 102 and/or one or more light modules 106. In the example illustrated in FIGS. 8 and 9, the mounting features 130, 134 are bracket extensions, and screws are utilized to position and secure the light modules 106 and electronics housing 102 relative to the connector assembly 104. However, various other suitable mechanisms (mechanical, chemical, etc.) may be utilized as the mounting features 130, 134 such that the light modules 106 and electronics housing 102 can be positioned relative to the connector assembly 104, and the disclosure of the bracket extensions should not be considered limiting on the current disclosure. In some cases, the mounting features 134 may engage the portions of the base wall 108 that extend beyond the side walls 110 at opposing ends of the electronics housing 102. In some cases, engagement between the mounting features 134 with the portions of the base wall 108 that extend beyond the sidewalls 110 may facilitate alignment of the channel 116 with the openings 132. Optionally, the mounting feature 134 also includes support features 138 that allow for the light fixture 100 to be suspended from a ceiling (such as with brackets, a pendant hanger, or other suitable mechanism) or otherwise supported relative to the ceiling. In the example illustrated in the figures, the support features 138 are apertures that connect with hooks and/or wiring or other suitable supports.

As best illustrated in FIG. 9, each connector assembly 104 includes a passageway 136 that extends along at least a portion of the connector assembly 104, and the openings 128, 132 provide access to the passageway 136. When the light fixture 100 is assembled, wiring or other electrical connections may pass from the electronics housing 102 (via channel 116), through the opening 132, into the passageway 136, and to one or more of the light modules 106 through the opening(s) 128, or vice versa. In some optional embodiments, the outermost side of each connector assembly 104 (e.g., the endcap 122 in the example of FIGS. 1-13) may be fully closed given that wires do not need to exit those sides and so as to impart a polished appearance to the light fixture 100.

Any number of light modules 106 can be added to form the light fixture 100. The number of light modules 106 included may be utilized to control the lumen output of the light fixture 100. Each light module 106 includes a base 139 on which are supported one or more light sources (such as light emitted diodes ("LEDs")). In some cases, each base 139 may connected to corresponding mounting features 130 on the connector assemblies 104 so as to retain the light modules 106 on the fixture 100. The lower surface of the base 139 (the surface on which the light sources are mounted) may optionally be highly reflective so as to reflect light emitted by light sources. While LEDs are described, it will be recognized that the invention may be embodied in light fixtures using other kinds of light sources, for example fluorescent, incandescent, halogen, etc. When LEDs are utilized, the LEDs may be various types of LEDs including single-die LEDs, multi-die LEDs, direct current (DC) LEDs, alternating current (AC) LEDs, organic light emitting diodes, and/or various other suitable LEDs. White, color, or multicolor LEDs, or combinations thereof, may be used. Moreover, the LEDs need not all be the same color and/or type; rather, mixtures of different colors and/or types of LEDs may be used. The LEDs may be provided on one or more printed circuit boards (PCBs). However, in other embodiments, no PCB is needed; rather, the LEDs may be chip-on-board LEDs provided directly on the base 139. In further examples, any number of PCBs may be utilized, including more than one PCB.

In some cases, the light fixture 100 may be used as an open fixture (i.e., the light modules 106 remain open and air is free to enter each light module 106 from below). In other examples, and as illustrated in FIGS. 1-13, an optic 140 may be mounted onto the light modules 106 and over the LEDs to enclose each light module 106. For example, in one embodiment the optic 140 snap fits onto the base 139. The optic 140 may be retained in other ways and using various other suitable mechanisms as desired. When included, the optic 140 may serve both as an aesthetic cover and to functionally direct or diffuse light to provide better lighting conditions. The optic 140 may be of any type (diffuse, prismatic, etc.) that achieves the desired light emission from the light fixture 100. In some cases, the optic 140 can be made of any non-metallic material that permits light to exit through the optic 140, including, but not limited to, polymeric materials, glass, silicone and various other suitable materials for light distribution. In some examples, the optic 140 may be tinted various colors to further control the wavelength profile of light emitted from the light fixture 100. As one example, the optic 140 may be tinted red or any other suitable color to further promote plant growth in a horticultural environment. While a curved optic 140 is shown, the optic 140 may have any geometry and may be provided with any surface enhancements or no surface enhancements as desired. In certain aspects, the number of light modules 106 and the type of optic 140 may be controlled to control the lumen output of the light fixture 100 to be suitable for a particular environment.

When the light fixture 100 is assembled, the light modules 106 are connected to the connector assemblies 104 through the mounting features 130. In some cases, a gap 142 is provided between adjacent light modules 106. The gap 142 may promote thermal management of the light fixture 100 and allow for air to flow between the light modules 106 and optionally to the electronics housing 102. As mentioned, the ventilation slots 118 promote thermal management of the electronics housing 102 and allow for air to flow through the electronics housing 102. Optionally, one or more of the light modules 106 may be rotatable when positioned on the connector assemblies 104 (see, e.g., arrow 146 in FIG. 12) such that an illumination area of one or more of the light modules 106 can be adjusted as desired. In one non-limiting example, the outermost light modules 104 (e.g., the leftmost and rightmost light modules 106 in FIG. 12) may be rotatable relative to the connector assemblies 104 and/or other components of the light fixture 100 as desired. Various suitable mechanisms may be utilized such that one or more of the light modules 106 is rotatably relative to the connector assemblies 104, including, but not limited to, hinges, bearings, clips, or other suitable movement mechanisms.

Figure 12:
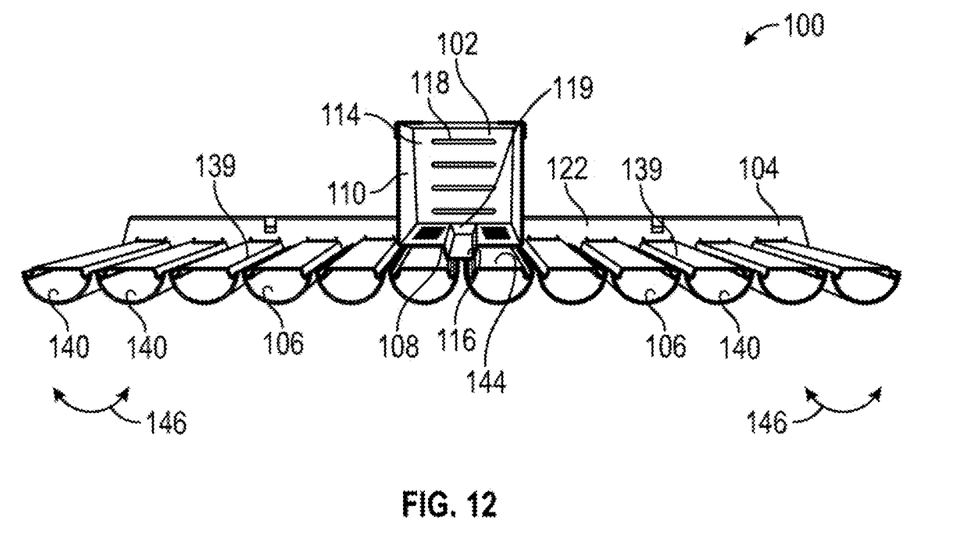
FIG. 12 is another cut away view of the light fixture of FIG. 1.
Figure 13:
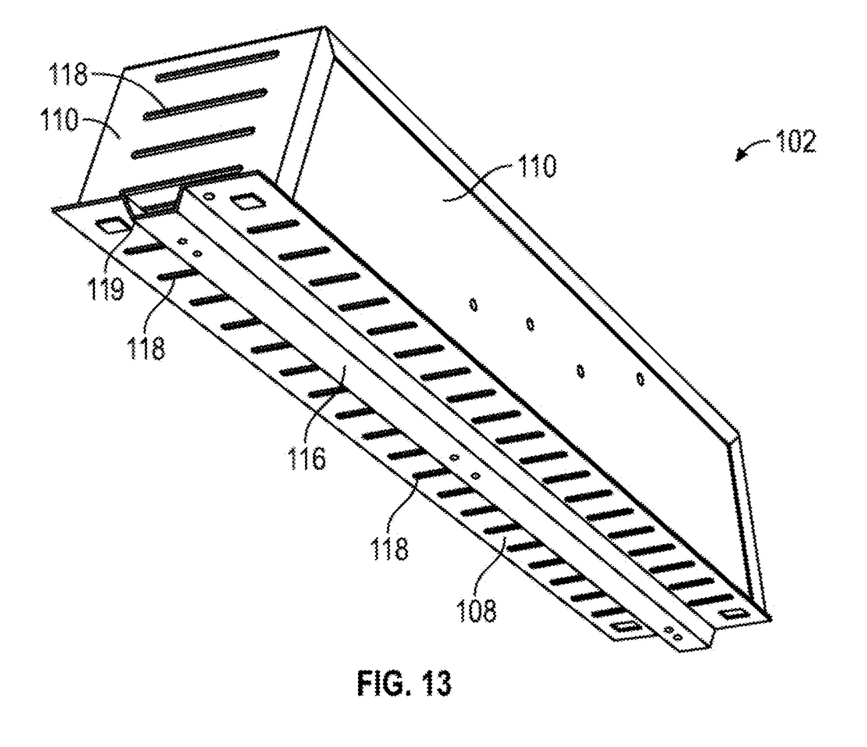
FIG. 13 is a bottom perspective view of a housing of the light fixture of FIG. 1 according to embodiments of the disclosure.

The electronics housing 102 is connected to the connector assemblies 104 through the mounting features 134. In some examples, and as best illustrated in FIG. 12, the electronics housing 102 may be positioned above the light modules 106 such that a gap 144 is between the electronics housing 102 and the light modules 106. Similar to the gap 142, the gap 144 may promote thermal management of the light fixture 100 by allowing for air to flow between the electronics housing 102 and the light modules 106. Optionally, the electronics housing 102 is provided in a plane above (i.e., offset from) the light modules 106, although it will be appreciated that the light modules 106 need not be positioned in a single plane. In various aspects, the electronics housing 102 is offset from the light modules 106 such that the electronics housing 102 is on a non-light emitting side of the light fixture 100. In some cases, the electronics housing 102 is positioned vertically above one or more of the light modules 106, although it need not be in other examples. In various examples, the electronics housing 102 is not directly connected to the light modules 106 (i.e., the electronics housing 102 is indirectly connected to the light modules 106 through the connector assemblies 104). In other examples, the electronics housing 102 may be directly connected to one or more of the light modules 106.

In use, the main power supply enters the electronic housing 102 to power the driver(s) and other electronics housed in the electronic housing 102. Wires from the driver, in turn, are fed into and through the connector assemblies 104 and into the respective light modules 106 to power the LEDs residing in each light module 106. In this way, the connector assemblies 104 act as a wireway. The light modules 106 may be connected in series or in parallel.

In another embodiment, the driver(s) are not housed in the electronic compartment. Rather, a dedicated driver for a light module 106 resides in one or both of the connector assemblies 104. In this way, the light modules 106 may be electronically autonomous. Each driver is powered by the main power supply entering the electronic housing 102 such that the light modules 106 are connected in parallel.

As mentioned, the ventilation slots 118, gaps 142, and/or gaps 144 enhance thermal management of the light fixture 100 by minimizing or avoiding creation of a thermal path between the light modules 106 and the electronic housing 102 and thus help to thermally isolate these components. These features may also allow for air flow within the various components to further promote thermal management. In use, heat generated by the LEDs is conducted and spread to the light module base for conductive cooling, and heat generated by the electronics in the electronic housing is spread to the various walls of the electronic housing. Cooler air from below the fixture is permitted to move through the air gaps and ventilation openings and circulate around the light modules and around and/or within the electronic housing, carrying away heat during such movement. Thus, heat dissipation from the light fixture 100 results both from conduction of heat as well as convection of heat from the light modules and electronic housing to the air circulating through and around the light fixture.

The structural components of the light fixture 100 (electronic housing 102, connector assemblies 104, light modules 106) may be formed of any material having suitable structural integrity and rigidity, including polymeric and metallic materials. In some embodiments, the components are formed from materials also having suitable thermal management capabilities so as to conduct heat generated by the LEDs. Metallic materials, such as but not limited to steel and aluminum, may be particularly suitable. The components of the fixture can, but need not, be formed from the same materials. Moreover, the components may be formed using a variety of different technologies, including, but not limited to, extrusion, roll-forming, die-forming, stamping, casting, etc.

The light modules 106 and connector assemblies 104 may be provided in any length. Moreover, the light fixture 100 may be easily tailored to provide the desired lumen output by adding or removing light engines from the light fixture 100. Providing light engines that are self-contained and all the same facilitate this customization process.

In various aspects, one or both of the connector assemblies 104 configured to accommodate a first number of light modules 106 may be exchanged with one or more connector assemblies configured to accommodate a second number of light module 106. The first number of light modules 106 may be greater than or less than the second number of light module 106. The connector assemblies 104 may be exchanged by disconnecting the light modules 106 from the module support locations 124 and disconnecting the electronics housing 102 from the housing support location 126. The replacement connector assembly 104 may then be connected to the light modules 106 by supporting the light modules 106 at the module support locations 124 on the replacement assembly 104 and supporting the electronics housing 102 at the housing support location 126 on the replacement assembly 104. The easily detachable connector assemblies 104 may provide easy scaling of the light fixture 100 as desired such that the light fixture 100 provides the desired lumen output.

EXAMPLES

A collection of exemplary embodiments, including at least some explicitly enumerated as "Examples" providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1

A light fixture comprising: an electronics housing comprising a first end and a second end opposite from the first end; a first connector assembly and a second connector assembly, wherein the electronics housing extends between the first connector assembly and the second connector assembly; and a plurality of light modules, each light module comprising at least one light source, wherein each light module is supported by the first connector assembly and the second connector assembly and extending between the first connector assembly and the second connector assembly, wherein the electronics housing is not directly connected to the plurality of light modules, and wherein the electronics housing is provided in a plane offset from the plurality of light modules.

Example 2

The light fixture of the preceding or subsequent examples or combination of examples, wherein the light fixture is a horticultural light fixture.

Example 2a

The light fixture of the preceding or subsequent examples or combination of examples, wherein each light module comprises a base and an optic attached to the base over the at least one light source.

Example 2b

The light fixture of the preceding or subsequent examples or combination of examples, wherein the optic is tinted red.

Example 3

The light fixture of the preceding or subsequent examples or combination of examples, wherein the electronics housing further comprises a base wall, a top wall opposite from the base wall, and at least one side wall extending from the base wall to the top wall, wherein the base wall, the top wall, and the at least one side wall define a housing chamber, and wherein the base wall and the top wall each comprise a plurality of ventilation apertures that are in fluid communication with the housing chamber.

Example 4

The light fixture of the preceding or subsequent examples or combination of examples, wherein at least a portion of the base wall extends beyond the side wall proximate to at least one of the first end or the second end such that less than the entire base wall defines the housing chamber.

Example 5

The light fixture of the preceding or subsequent examples or combination of examples, wherein the base wall comprises a channel portion extending in a direction opposite from the top wall, wherein the channel portion is in communication with the housing chamber, and wherein the first connector assembly and the second connector assembly each comprise: a housing support location comprising an opening and a housing mounting feature; a plurality of module support locations, each comprising an opening and a module mounting feature; and a passageway, wherein the opening of the housing support location is in fluid communication with each of the openings of the plurality of module support locations via the passageway, and wherein the electronics housing is supported relative to the first connector assembly and the second connector assembly such that the channel portion is in fluid communication with the opening of the housing support location of each of the first connector assembly and the second connector assembly.

Example 6

The light fixture of the preceding or subsequent examples or combination of examples, wherein the first connector assembly and the second connector assembly each comprise: wherein each of the plurality of light modules is supported at a corresponding one of the plurality of module support locations on the first connector assembly and the second connector assembly, and wherein the first end of the electronics housing is supported at the housing support location on the first connector assembly and the second end of the electronics housing is supported at the housing support location on the second connector assembly.

Example 7

The light fixture of the preceding or subsequent examples or combination of examples, wherein the housing support location comprises a housing mounting feature and an opening, and wherein each of the plurality of module support locations comprises a module mounting feature and an opening.

Example 8

A light fixture comprising: an electronics housing comprising a first end and a second end opposite from the first end; a connector assembly comprising: a housing support location; and a plurality of module support locations, each module support location configured to position a light module relative to the connector assembly, wherein the housing support location is vertically offset from the plurality of module support locations, and wherein the first end of the electronics housing is attached to the connector assembly at the housing support location; and at least one light module comprising at least one light source, wherein the at least one light module is attached to the connector assembly at one of the plurality of module support locations.

Example 9

The light fixture of the preceding or subsequent examples or combination of examples, wherein the light fixture is a horticultural light fixture.

Example 10

The light fixture of the preceding or subsequent examples or combination of examples, wherein the housing support location comprises an opening and a housing mounting feature, wherein each of the plurality of module support locations comprises an opening and a module mounting feature, and wherein the connector assembly further comprises a passageway in fluid communication with the opening of the housing support location and each opening of the plurality of module support locations.

Example 11

The light fixture of the preceding or subsequent examples or combination of examples, wherein: the electronics housing further comprises a base wall, a top wall opposite from the base wall, and at least one side wall extending from the base wall to the top wall; the base wall, the top wall, and the at least one side wall define a housing chamber; the base wall comprises a channel portion extending in a direction opposite from the top wall; the channel portion is in communication with the housing chamber; and the first end of the electronics housing is attached to the housing support location such that the channel portion is in fluid communication with the opening of the housing mounting feature.

Example 12

The light fixture of the preceding or subsequent examples or combination of examples, wherein the base wall and the top wall each comprise a plurality of ventilation apertures that are in fluid communication with the housing chamber.

Example 13

The light fixture of the preceding or subsequent examples or combination of examples, wherein the at least one light module comprises a plurality of light modules, and wherein the plurality of light modules are arranged in a plane that is offset from a plane of the electronics housing.

Example 13a

The light fixture of the preceding or subsequent examples or combination of examples, wherein each light module comprises a base and an optic attached to the base over the at least one light source.

Example 14

A light fixture comprising: an electronics housing comprising a base wall, a top wall opposite from the base wall, and at least one side wall extending from the base wall to the top wall, wherein the base wall, the top wall, and the at least one side wall define a housing chamber, and wherein the base wall and the top wall each comprise a plurality of ventilation apertures that are in fluid communication with the housing chamber; and a first connector assembly and a second connector assembly, wherein the electronics housing extends between the first connector assembly and the second connector assembly; and a first light module and a second light module, each extending between the first connector assembly and the second connector assembly, wherein the first light module and the second light module each comprise at least one light source, wherein the first light module and the second light module extend at least partially below the base wall of the electronics housing, and wherein the first light module is horizontally spaced apart from the second light module such that a gap is between the first light module and the second light module.

Example 15

The light fixture of the preceding or subsequent examples or combination of examples, wherein the light fixture is a horticultural light fixture.

Example 16

The light fixture of the preceding or subsequent examples or combination of examples, wherein the electronics housing is not directly connected to any of the light modules.

Example 17

The light fixture of the preceding or subsequent examples or combination of examples, wherein the first light module and the second light module are vertically offset from the base wall of the electronics housing below the base wall of the electronics housing such that a vertical gap is between the base wall and both of the first light module and the second light module.

Example 18

The light fixture of the preceding or subsequent examples or combination of examples, wherein the first connector assembly and the second connector assembly each comprise an inner plate and an end cap that together define a passageway.

Example 19

The light fixture of the preceding or subsequent examples or combination of examples, wherein the inner plate of each of the first connector assembly and the second connector assembly comprises: a housing support location comprising an opening and a housing mounting feature; and a plurality of module support locations, each module support location comprising an opening and a module mounting feature, wherein the opening of the housing support location is in fluid communication with each of the openings of the module support locations via the passageway.

Example 20

The light fixture of the preceding or subsequent examples or combination of examples, further comprising: a third light module extending between the first connector assembly and the second connector assembly and adjacent to the second light module such that the second light module is between the first light module and the third light module, wherein the gap is a first gap, wherein the third light module is horizontally spaced apart from the second light module such that a second gap is between the third light module and the second light module, and wherein the third light module is rotatable relative to the first connector assembly and the second connector assembly.

Example 21

The light fixture of the preceding or subsequent examples or combination of examples, wherein each light module comprises a base and an optic attached to the base over the at least one light source, and wherein the optic is tinted red The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

That which is claimed:

1. A light fixture comprising:
an electronics housing comprising a first end and a second end opposite from the first end;
a first connector assembly and a second connector assembly, wherein the electronics housing extends between the first connector assembly and the second connector assembly; and
a plurality of light modules, each light module comprising at least one light source, wherein each light module is supported by the first connector assembly and the second connector assembly and extending between the first connector assembly and the second connector assembly,
wherein the electronics housing is not directly connected to the plurality of light modules,
wherein the electronics housing is provided in a plane offset from the plurality of light modules,
wherein the electronics housing further comprises a base wall, a top wall opposite from the base wall, and at least one side wall extending from the base wall to the top wall, wherein the base wall, the top wall, and the at least one side wall define a housing chamber, wherein the base wall and the top wall each comprise a plurality of ventilation apertures that are in fluid communication with the housing chamber, wherein the base wall comprises a channel having opposing open ends and extending in a direction opposite from the top wall, wherein the channel is in communication with the housing chamber, and wherein the first connector assembly and the second connector assembly each comprise:
- a housing support location comprising an opening and a housing mounting feature;
- a plurality of module support locations, each comprising an opening and a module mounting feature; and
- a passageway, wherein the opening of the housing support location is in fluid communication with each of the openings of the plurality of module support locations via the passageway, and wherein the electronics housing is supported relative to the first connector assembly and the second connector assembly such that each of the opposing open ends of the channel is in fluid communication with the opening of the housing support location of one of the first connector assembly and the second connector assembly.

2. The light fixture of claim 1, wherein each light module comprises a base and an optic attached to the base over the at least one light source.

3. The light fixture of claim 2, wherein the optic is tinted red.

4. The light fixture of claim 1, wherein at least a portion of the base wall extends beyond the side wall proximate to at least one of the first end or the second end such that less than the entire base wall defines the housing chamber.

5. The light fixture of claim 1, wherein:
- each of the plurality of light modules is supported at a corresponding one of the plurality of module support locations on the first connector assembly and the second connector assembly, and
- the first end of the electronics housing is supported at the housing support location on the first connector assembly and the second end of the electronics housing is supported at the housing support location on the second connector assembly.

6. The light fixture of claim 5, wherein the housing support location comprises a housing mounting feature and an opening, and wherein each of the plurality of module support locations comprises a module mounting feature and an opening.

7. A light fixture comprising:
an electronics housing comprising a first end and a second end opposite from the first end;
a connector assembly comprising:
- a housing support location; and
- a plurality of module support locations, each module support location configured to position a light module relative to the connector assembly,
wherein the housing support location is vertically offset from the plurality of module support locations,
wherein the housing support location and the plurality of module support locations are between a top end and a bottom end of the connector assembly, and
wherein the first end of the electronics housing is attached to the connector assembly at the housing support location; and at least one light module comprising at least one light source, wherein the at least one light module is attached to the connector assembly at one of the plurality of module support locations between the top end and the bottom end of the connector assembly, wherein the housing support location comprises an opening and a housing mounting feature, wherein each of the plurality of module support locations comprises an opening and a module mounting feature, and wherein the connector assembly further comprises a passageway in fluid communication with the opening of the housing support location and each opening of the plurality of module support locations, wherein:
- the electronics housing further comprises a base wall, a top wall opposite from the base wall, and at least one side wall extending from the base wall to the top wall;
- the base wall, the top wall, and the at least one side wall define a housing chamber;
- the base wall comprises a channel portion extending in a direction opposite from the top wall;
- the channel portion is in communication with the housing chamber; and
- the first end of the electronics housing is attached to the housing support location such that the channel portion is in fluid communication with the opening of the housing mounting feature.

8. The light fixture of claim 7, wherein the base wall and the top wall each comprise a plurality of ventilation apertures that are in fluid communication with the housing chamber.

9. The light fixture of claim 7, wherein the at least one light module comprises a plurality of light modules, and wherein the plurality of light modules are arranged in a plane that is offset from a plane of the electronics housing, and wherein each light module comprises a base and an optic attached to the base over the at least one light source.

10. A light fixture comprising:
an electronics housing comprising a base wall, a top wall opposite from the base wall, and at least one side wall extending from the base wall to the top wall, wherein the base wall, the top wall, and the at least one side wall define a housing chamber, and wherein the base wall and the top wall each comprise a plurality of ventilation apertures that are in fluid communication with the housing chamber; and
a first connector assembly and a second connector assembly, wherein the electronics housing extends between the first connector assembly and the second connector assembly; and
a first light module and a second light module, each extending between the first connector assembly and the second connector assembly,
wherein the first light module and the second light module each comprise at least one light source,
wherein the first light module and the second light module each extend at least partially below the base wall of the electronics housing, and
wherein the first light module is horizontally spaced apart from the second light module such that a gap is between the first light module and the second light module,
wherein the first connector assembly and the second connector assembly each comprise an inner plate and an end cap that together define a passageway, and wherein the inner plate of each of the first connector assembly and the second connector assembly comprises:
- a housing support location comprising an opening and a housing mounting feature; and
- a plurality of module support locations, each module support location comprising an opening and a module mounting feature,
- wherein the opening of the housing support location is in fluid communication with each of the openings of the module support locations via the passageway.

11. The light fixture of claim 10, wherein each light module comprises a base and an optic attached to the base over the at least one light source, and wherein the optic is tinted red.

12. The light fixture of claim 10, wherein the electronics housing is not directly connected to any of the light modules.

13. The light fixture of claim 10, wherein the first light module and the second light module are vertically offset from the base wall of the electronics housing below the base wall of the electronics housing such that a vertical gap is between the base wall and both of the first light module and the second light module.

14. The light fixture of claim 10, further comprising:
- a third light module extending between the first connector assembly and the second connector assembly and adjacent to the second light module such that the second light module is between the first light module and the third light module,
- wherein the gap is a first gap,
- wherein the third light module is horizontally spaced apart from the second light module such that a second gap is between the third light module and the second light module, and
- wherein the third light module is rotatable relative to the first connector assembly and the second connector assembly.

* * * * *